Sept. 28, 1943. B. H. KIDD 2,330,496
STUFFING MACHINE
Filed June 27, 1941
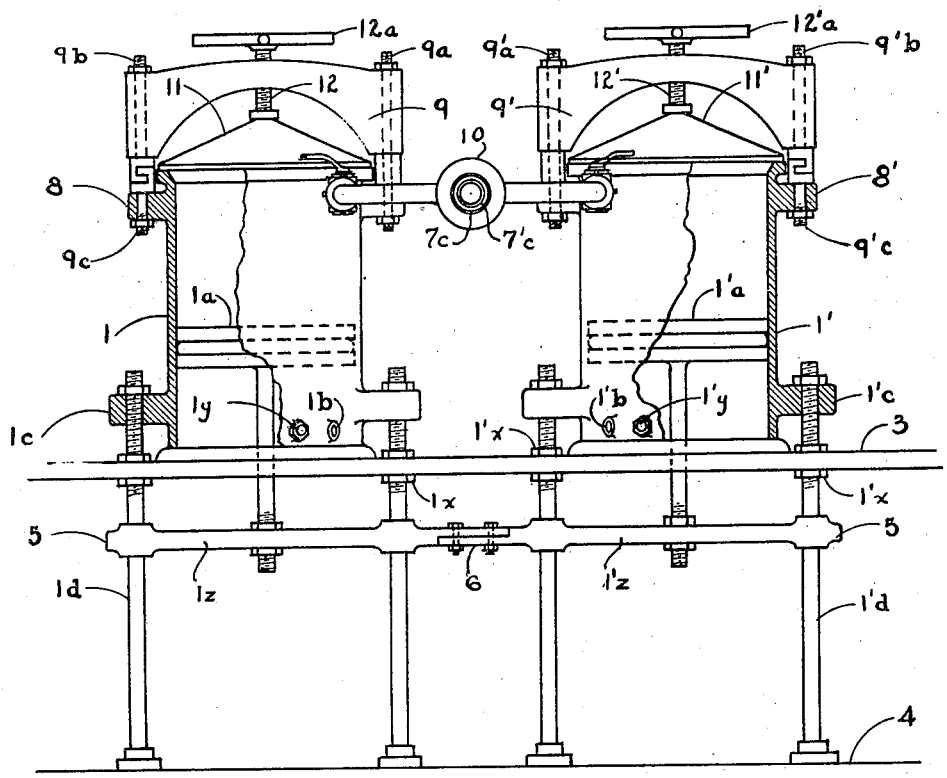
Fig. 1
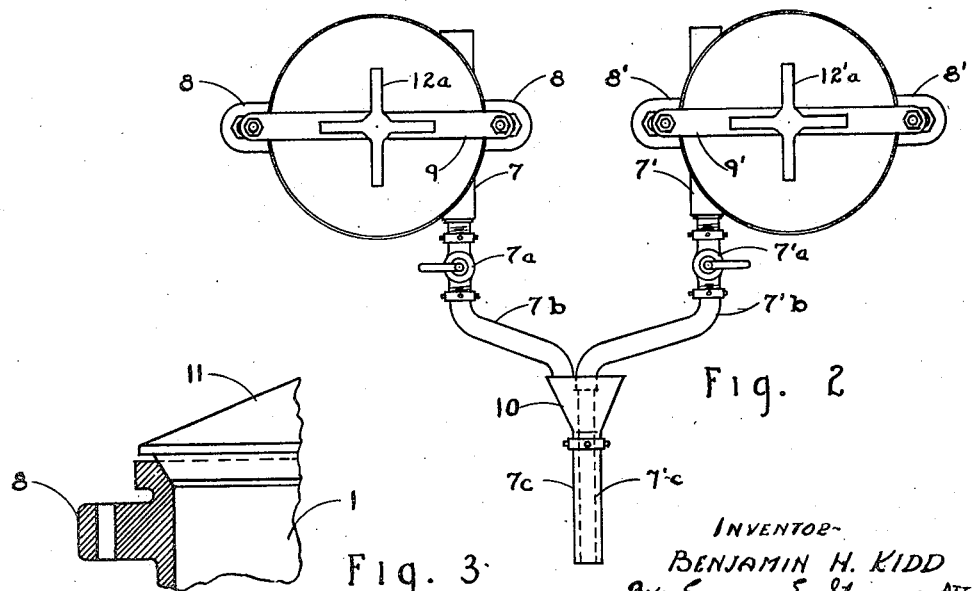
Fig. 2
Fig. 3
INVENTOR-
BENJAMIN H. KIDD
BY: Eugene E. Stevens, ATTY.

Patented Sept. 28, 1943

2,330,496

UNITED STATES PATENT OFFICE 2,330,496

STUFFING MACHINE

Benjamin H. Kidd, Louisville, Ky.

Application June 27, 1941, Serial No. 400,113

1 Claim. (Cl. 17—39)

My invention relates generally to stuffing machines applicable for various purposes as well as for stuffing wiener-casings; said machines comprising cylinders having air-tight covers carried by laterally swinging yokes and freely-moving pistons in the cylinders operated by air or other fluid under pressure. And the principal object of my present invention has been to design and construct two such cylinders stationed side by side and adapted to operate together or separately at the option of the operator, each cylinder containing different ingredients. Another object of my invention has been to design an outlet for said ingredients from each of said cylinders, said outlets being adjacent and opposite, and adapted for the entrance of the conventional threaded nipple and the tightly-fitting ingredient tube with its valve and extension stuffing-nozzle, which in my invention is double, comprising a small inner tube and a larger outer tube. I have also aimed to have a reasonably large cleaning hole plugged with a threaded stopper, in opposite sides of each of said cylinders, near the bottoms thereof. I also have threaded holes near the bottoms of each cylinder, designed for the entrance of the fluid pressure for operating the pistons therein. Other objects of my invention will be disclosed in the progress of this specification.

The foregoing objects have been attained in my instant invention; and my new and useful stuffing machine illustrated in the accompanying drawing forming a part of this specification is a practical device embodying the aforesaid novel means and other new and useful details of construction, arrangement and combination of parts, all of which together with their functions will be described with reference to said drawing, and will be definitely pointed out in the claim that follows this description, so that any person skilled in the art, may be able to construct and use this invention.

In said drawing:

Fig. 1 is a full view of the front part of my stuffing machine, partly in elevation and partly in section, showing the two adjacent vertically disposed cylinders set side by side, with their adjacent ingredient outlets near the tops of said cylinders.

Fig. 2 is a plan view of the upper part of both said adjacent cylinders, with the laterally swinging yokes and the appended cylinder covers in place, showing the relative positions of the outlet tubes, the cutoff valves, the ingredient tubes and the conical ingredient hood.

Fig. 3 is an elevational view, partly in section, of a fragment of the beveled cylinder cover, showing the air-tight joint between the beveled cover and the correspondingly beveled upper rim of said cylinder.

This invention has been designed and experimentally developed in its construction for the purpose of producing at a minimum cost, a durable, useful and efficient stuffing machine for rapidly stuffing sauerkraut-filled wieners and for forming other designs of food-products. And with this purpose and the special objects aforesaid in view, I will now describe my invention more fully in detail, pointing out the new and useful features of the construction and the operation of the individual parts and the combinations thereof, as illustrated in the drawing hereinabove described, in which similar letters and characters refer to similar parts throughout the several views.

In the invention and development of my new stuffing machine, for rapidly stuffing sauerkraut-filled wieners and for forming other designs of food products, for the sake of rapidity in production and efficiency in operation, I have designed an arrangement of two vertically disposed adjacent cylinders 1 and 1', rigidly installed side by side on a floor 3, as shown in Fig. 1; said cylinders being adapted to hold food products of different kinds.

Cylinders 1 and 1' are provided respectively with the freely moving pistons 1a and 1'a, operative by means of compressed air or other fluids under pressure, admitted thereunder through the respective threaded holes 1b and 1'b. On these cylinders 1 and 1' I have cast heavy integral pillow-blocks, respectively, 1c and 1'c for the purpose of anchoring said cylinders 1 and 1' respectively, to the floor 3 with heavy metal rods 1d and 1'd, extending down through said floor to the basement flooring 4, where said metal rods are securely anchored. Said threaded metal rods 1d and 1'd are provided respectively with threaded floor-flanges 1x and 1'x for anchorage and adjustment in the floor 3. I have provided the pistons, 1a and 1'a, respectively with metal-rod shanks fastened on the underside thereof and passing air-tight through the solid metal bottoms of said cylinders and the floor 3 to be anchored and adjusted in the cross-beam 5 adapted to slide evenly up and down on the metal rods 1d and 1'd between the floor 3 and the basement flooring 4. And the cross-beam 5 I have fashioned in two sections, 1z and 1'z, securely bolted together at the joint 6 therein; for, sometimes I want the pistons 1a and 1'a to operate together and sometimes separately. For the purpose of cleaning out that portion of said cylinders under the pistons, 1a, 1'a, I have designed reasonably large cleaning ports, 1y and 1'y respectively, in opposite sides of each of the cylinders, 1 and 1', near the bottoms thereof; said ports being adapted to be plugged with threaded stoppers.

In Fig. 2 I have shown the adjacent outlet-tubes 7 and 7', and the pillow-blocks, 8 and 8' adapted to support the laterally-swinging yokes, 9 and 9'. These outlet-tubes and pillow-blocks are cast integral with the cylinders 1 and 1'. On the front ends of the outlet-tubes, 7 and 7', I have fitted the cut-off valves 7a and 7'a and into the front sides of said cut-off valves I have fitted air-tight the ingredient-tubes 7b and 7'b, the forward ends of which are welded into the plane rear end of the conical air-tight hood 10. The interior of the front end of the ingredient-tube 7'b, I have threaded so that I may screw the threaded end of the small stuffing nozzle 7c thereinto air-tight. And to the front end of the conical hood 10 I have fitted air-tight the large stuffing nozzle 7c, which is adapted to hold the casing of a sauerkraut-filled wiener. The front ends of the stuffing nozzles, 7c and 7'c terminate in the same vertical plane, at right-angles thereto. The rear ends of the outlet-tubes, 7 and 7' may be outfitted with fixtures similar to the fixtures in the front ends of said tubes. This arrangement would double the number of weiners or other designs of food-products produced in any given time.

The inner ends of the laterally-swinging yokes, 9 and 9', are pivoted in the inner adjacent upper pillow-blocks, 8 and 8', and are securely held in their service positions by means of the pivots, 9a and 9'a; said pivots being secured with threaded nuts fixed on the threaded end of said pivots. And the outer ends of said swinging yokes are clamped on the outer pillow-blocks, 8 and 8', securely held in their fixed positions by means of the pivots, 9b, 9c and 9'b, 9'c, said pivots being secured with threaded nuts fixed on the threaded ends of said pivots.

The cylinder-covers, 11 and 11', are carried swiveled on the lower ends of the threaded bolts, 12 and 12', and said covers can be readily forced open or closed air-tight by screwing said bolts upward or downward in said yokes by means of the cruciform levers, 12a and 12'a, rigidly fixed on the upper ends of said bolts at right-angles thereto.

Operation of said machine

In the production of sauerkraut-filled wieners, I first raise the cylinder-covers, 11 and 11' by rotating the threaded bolts 12 and 12'; then, after loosening the clamping pivots, 9b, 9c and 9'b, 9'c, I swing the yokes, 9 and 9' carrying the covers, 11 and 11' with them out away from the open tops of the cylinders 1 and 1'. I then fill into the open cylinder 1 a predetermined quantity of my ground-meat ingredient prepared like ordinary wiener ingredient. And into the cylinder 1' I fill a predetermined quantity of sauerkraut-ingredient prepared according to my formula, giving the sauerkraut the right consistency to be forced through the ingredient-tube, 7'b and the small stuffing nozzle 7'c with a pressure equal to the pressure required to force the ground meat of the ordinary wiener-ingredient through the ingredient-tube 7b and the large stuffing nozzle 7c, which holds the wiener-casing stretched thereon. I now swing the yokes 9 and 9' carrying the cylinder-covers, 11 and 11', back over the tops of the cylinders, 1 and 1' and screw said covers down air-tight in the beveled rims of said cylinders, and tighten the clamping pivots 9b, 9c and 9'b, 9'c, to hold said yokes in their service positions. And now that the air-pressure tubes are connected up to the threaded holes 1b and 1'b; and the cut-off valves 7a and 7'a are open, I am ready to produce sauerkraut-filled wieners.

When I desire to make other designs of food-products with this said machine, I would use only one cylinder, namely, cylinder 1. And in this event, I would cut off the air-pressure from cylinder 1' and I would also remove the two bolts from the joint 6 in the cross-beam 5, so that the cylinder 1 may operate freely without disturbing the piston 1'a in the cylinder 1'. Then I clean out the cylinder 1 and its tubes and cut-off valve and unscrew both stuffing nozzles and remove them from the hood 10. I then fix into the outer end of the hood 10 any design nozzle I select for my other food-product; and after preparing my new ingredient for the other designs of food-products, I fill the cylinder 1 with a predetermined quantity of the new ingredient for the other designs of food-products; and then proceed to produce them under air-pressure in quantities desired.

Thus it can readily be seen that I have designed and developed a new and efficient stuffing machine adapted for rapidly stuffing sauerkraut-filled wieners and for forming and producing other designs of food-products. But in the description of said new and useful machine, as set forth in the foregoing specification, it should be well understood that the specific detail of the various parts of the instant embodiment of my present invention, as I have illustrated in the drawing thereof and fully described, are not to be considered as limitations in the construction of my new device; and that while keeping within the scope of my invention and claim, I may make desirable modifications in these details to facilitate quantity production or to economize in the fabrication of the parts thereof, provided I keep within the spirit and scope of my invention and claim.

Now, having thus described the various features of my new invention, the detail construction, arrangement and combination of its parts, as well as their functions and the ways and means of assemblage, operation and application; those features and accessories of my new device for the purposes hereinabove explained, on which I desire Letters Patent granted to me, I have set forth specifically in the following claim.

I claim:

In a stuffing machine of the kind shown and described, the combination of two adjacent vertical food-cylinders resting upon the floor above a basement; said cylinders having air-tight covers and provided with air-tight freely-moving pistons operative by compressed air or other fluids under pressure in said cylinders; integral pillow-blocks or heavy lugs cast on the opposite sides of said cylinders near the bottoms thereof; said cylinders being held in place by means of posts anchored in said basement and passing up through said floor and fastened in said lugs; a cross-beam in said basement adapted to slide up and down on said posts; vertical rods fixed on the under sides of said pistons and extending air-tight down through the bottoms of said cylinders and through said floor and adjustably fastened in said cross-beam, so as to limit the upward movement of said pistons; adjacent parallel outlet tubes cast in the adjacent sides of said cylinders near the tops thereof, said tubes being open at both ends and adapted for the entrance of threaded nipples and cut-off valves, having fixed therein curved food tubes extending into a conical hood; and double stuffing nozzles fixed in said hood, comprising a small inner tube connected with one of said cylinders containing one kind of ingredient, and a larger outer tube connected with the other cylinder containing another kind of ingredient, said outer tube being adapted to hold the casing of a wiener.

BENJAMIN H. KIDD.